INVENTOR.
KENNETH F. PITTMAN
By George C. Sullivan
Agent

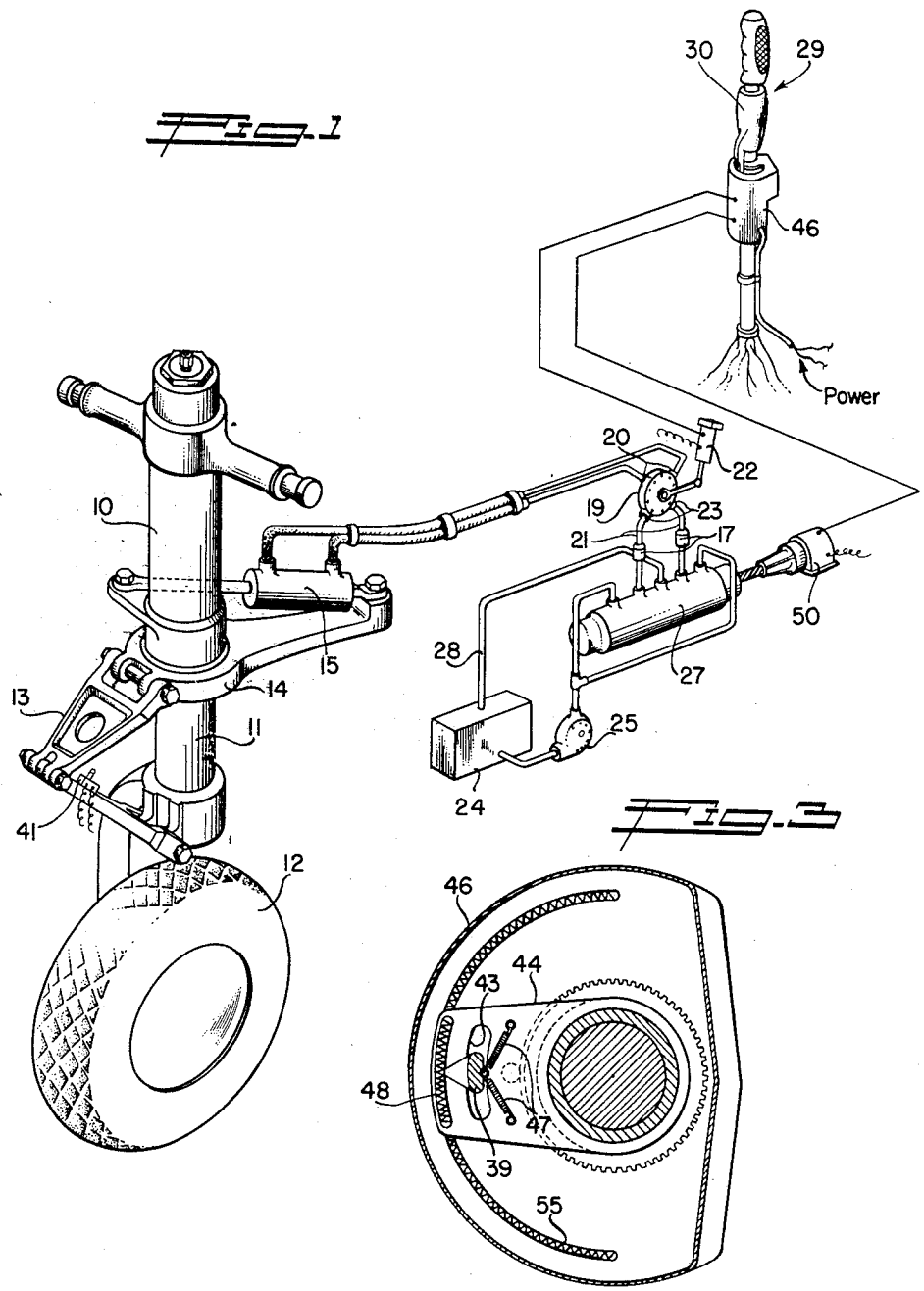

Patented Dec. 9, 1952

2,621,002

UNITED STATES PATENT OFFICE 2,621,002

STEERABLE LANDING GEAR FOR AIRPLANES

Kenneth F. Pittman, North Hollywood, Calif., assignor to Lockheed Aircraft Corporation, Burbank, Calif.

Application November 23, 1948, Serial No. 61,705

5 Claims. (Cl. 244—50)

This invention relates to a steerable landing gear for airplanes and is more particularly concerned with a normally self-centering landing gear wheel which can be steered at the will of the airplane pilot.

It is a further object of this invention to provide such a steerable landing gear control wherein the steering effect is limited to taxiing or ground contact and wherein the landing gear wheel so controlled will be freed from such steering control upon take-off and automatically self-center itself prior to and independently of retraction of the landing gear.

It is also an object of this invention to provide a steerable landing gear control of the type described wherein the pilot can simultaneously control the aileron and elevators to assist steering by control of the airplane attitude during steering of the landing gear.

It is a further object of this invention to provide a steering control of the type described having a follow-up control associated with the pilot's control handle and so arranged that the degree of out of phase relationship between the follow-up and control handle determines the speed of response of the steering controls to movements of the control handle.

Other and further objects of my invention will become apparent as the description of the embodiment chosen for illustrative purposes proceeds.

It is immaterial to this invention whether one or more landing wheels are simultaneously steered, or whether the landing gear is of the modern tricycle type or the older tail wheel type. Since it is more convenient to steer the odd wheel on a three wheel landing gear, in what follows the illustrated embodiment of my invention will be described in connection with a steerable nose wheel for a tricycle landing gear.

Figure 1 is a perspective view of a castering landing gear and wheel incorporating one form of steering control of my invention; details of the electrical system being omitted for clearness;

Figure 3 is a section on the line 3—3 of Figure 2 showing the follow-up mechanism associated with the hand grip.

Figures 2, 4:
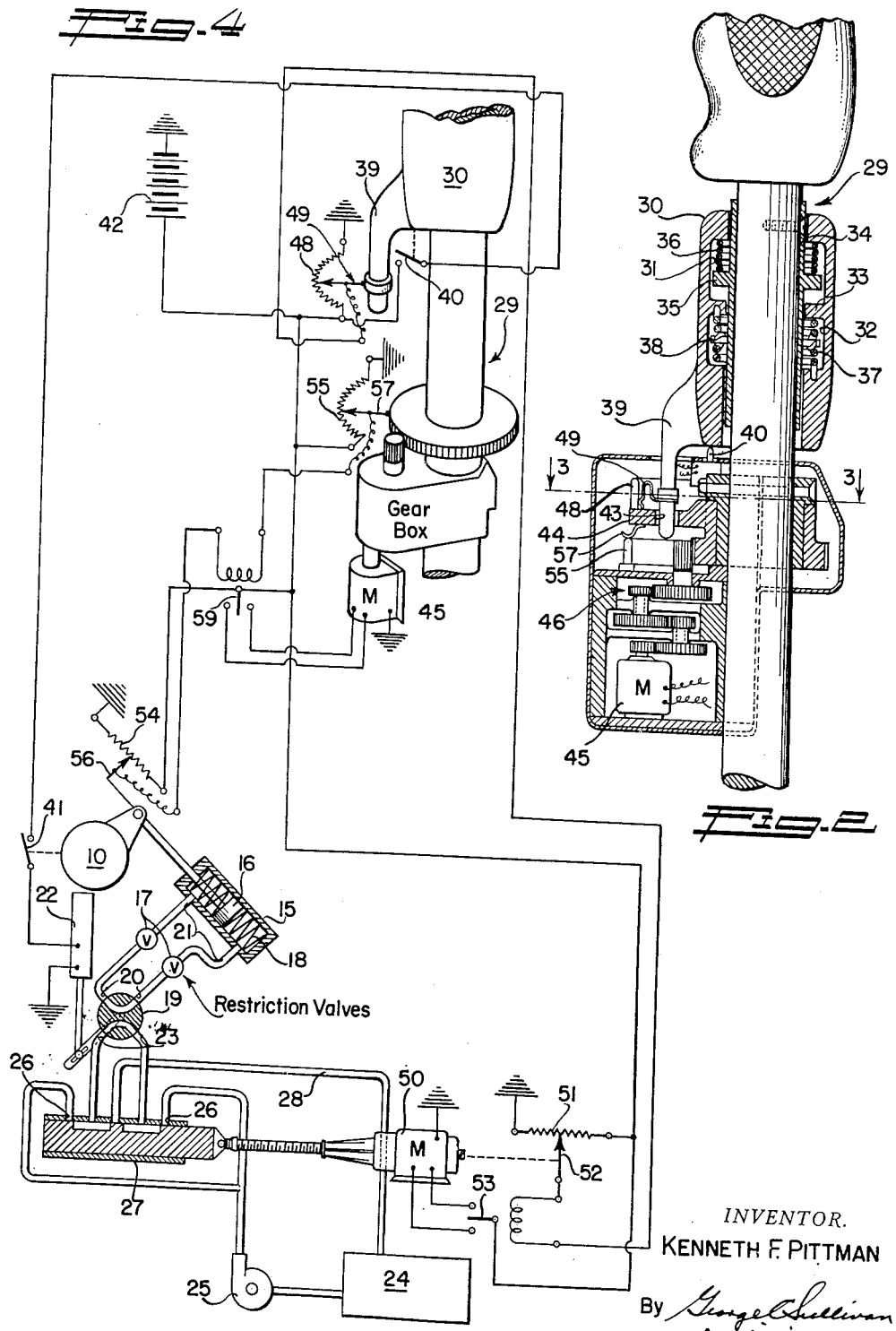
Figure 2 is an enlarged detail, partly in section, of the steering control hand grip applied to the airplane control stick as shown in Figure 1.
Figure 4 is a schematic illustration of the wiring diagram of my electric steering control as applied to the structure shown in Figure 1.

As shown in the drawings, I have chosen to illustrate the application of my electric steering control to a steerable and castering landing gear embodying a hydraulic power system for actual steering of the landing gear. The landing gear and the hydraulic system are largely conventional and, therefore, will only be briefly described herein.

For simplicity of description, the landing gear illustrated may be assumed to be the nose wheel of a modern tricycle arrangement wherein a shock strut comprising an outer cylinder 10, having an inner telescoping cylinder 11, supports a wheel 12. The inner cylinder 11 is normally held in alignment with the longitudinal axis of the airplane by torque scissors 13, the upper end of which is attached to a collar 14 on the outer cylinder which collar is normally held centered by a hydraulic cylinder 15 and piston 16 which provides a centering and shimmy damping effect when hydraulic communication between the two ends of the cylinder is restricted as by spring loaded one-way restrictor valves 17. Springs 18 provide a centering effect but permit castering of the nose wheel in response to turning forces resulting from ground friction. It thus becomes possible for the airplane pilot to steer the airplane by differential application of the brakes on the landing wheels, by utilization of aerodynamic forces on the airplane control surfaces, or by differential power application in the event the airplane has more than one power plant.

In order to convert the aforesaid landing gear to hydraulic power steering, a four-way valve 19 has two adjacent ports 20 connected by lines 21 through the one-way restriction valves 17 to opposite ends of the hydraulic cylinder 15, the valve 19 being shown in the castering position in Figure 4. In order to convert to power steering, the valve 19 is turned 90 degrees clockwise by a solenoid 22, in which position two other ports 23 are separately connected through the valve 19 to the lines 21 to either end of the hydraulic cylinder 15.

A hydraulic power system comprising a reservoir 24 and pump 25 supplies pressure fluid to end ports 26 in a valve 27, with a center return line 28 to the reservoir. The ports 23 of the four-way valve 19 are so connected to the valve 27 that axial displacement thereof either way in Figure 4 will supply pressure fluid to the corresponding end of the hydraulic cylinder 15 while the other end of the cylinder is vented to the reservoir. The high pressure fluid overcomes the restriction in the one-way restrictor valves 17, so that rapid and positive steering can be effected in proportion to the degree of opening of the valve 27.

It will be evident that a direct manual control of the motion of the valve 27 will effect turning motion of the landing gear but will lack any sense of "feel" by the operator as he would be unable to determine the position or direction of the landing gear resulting from such motion both because the landing gear would continue to rotate while the valve is displaced and because no indication would be available of the actual resulting position or the speed of motion thereof.

Accordingly, I provide a servo mechanism having a manual control, and a follow-up mechanism so associated with the manual control as to indicate both the resulting angular position of the landing gear and the speed of angular motion thereof, the latter being proportional to the out of phase relationship of the manual control and the follow-up mechanism.

Also, in order to permit simultaneous aerodynamic and steering control of an airplane equipped with the device of this invention, I prefer to mount the manual control on the airplane control stick 29 and to this end provide a hand grip 30 slidable and rotatable on the stick below the usual handle or wheel thereon. It will be understood that the stick can be moved fore and aft and side to side to operate the airplane elevator and ailerons and by grasping the hand grip 30 the pilot can simultaneously operate the control surfaces while also steering the landing gear.

The hand grip 30 is preferably formed with upper and lower internal cavities 31 and 32 separated by a shoulder 33 and is formed to be rotatable on a sleeve 34 secured to the stick which has a collar 35 normally held against the shoulder 33 by a spring 36 in the upper cavity 31. Pushing down on the hand grip 30, as shown in Figure 2, compresses the spring 36 to initiate the steering control, as will be described hereinafter. The lower cavity 32 contains torsion springs 37 engaging ears 38 carried by the sleeve 34 for self-centering of the hand grip after rotary motion thereof.

The hand grip 30 carries a depending offset finger 39, the rotary motion of which determines and indicates the steering effect, and the downward motion closes a switch 40 in series with a second switch 41 on the landing gear torque scissors, to apply power, as from a battery 42, to the solenoid 22 operating the previously described four-way valve 19 which "switches" the landing gear from castering to power steering.

The torque scissors switch 41 prevents inadvertent energization of the steering control when the airplane is airborne, as when the landing gear is being retracted or is already housed. In what follows, therefore, it will be assumed that there is enough weight on the landing gear to deflect the torque scissors to hold the switch 41 closed, as would be the case when the airplane is being taxied on the ground.

The grip finger 39 is arranged to extend downwardly through an elongated slot 43 in a follow-up arm 44 rotatably mounted on the stick 28 and driven by a motor 45 through a gear box 46. The grip finger 39 is normally held centered in the slot 43 by springs 47, and the arm 44 supports a potentiometer 48, the contact 49 of which is moved by the grip finger 39 when the latter is shifted in the arm slot 43.

The valve 27 is arranged to be moved by a motor 50, and a second potentiometer 51 has its contact 52 moved by the valve 27. The potentiometers 48 and 51 are connected to a polarized relay 53 adapted to energize the motor 50. Thus the direction and degree of unbalance introduced in the potentiometer 48 by manual movement of the grip finger 39 in the follow-up arm slot 43 determines the direction and extent of movement of the valve 27, which moves until the two potentiometers 48 and 51 are again in electrical balance. Accordingly, since the rapidity of angular movement of the landing gear will depend on the degree of opening of the valve 27, this in turn depends on the degree of angular displacement or out of phase relationship of the hand grip 30 relative to the follow-up arm 44, which displacement unbalances the two potentiometers and thus energizes the associated polarized relay 53.

With the foregoing described arrangement the valve 27 would be opened by an out of phase relationship between the hand grip 30 and the follow-up arm 44, so that the pivotal movement of the steerable landing gear would continue as long as the hand grip was held in a displaced position against the force of the centering springs 47.

In order to cause the follow-up arm 44 to move in step with the angular position of the landing gear a second pair of potentiometers 54 and 55 are arranged with their contacts 56 and 57 respectively moved by the steerable landing gear and the follow-up arm 44, a polarized relay 59 being balanced between those potentiometers to energize the motor 45 driving the follow-up arm 44. With this arrangement the follow-up arm 44 will be angularly adjusted in step with the pivotal movement of the landing gear so that if the hand grip 30 is held in its first adjusted position the follow-up arm 44 will rotate until in phase therewith so that the landing gear will be adjusted in alignment with the finger 39 on the hand grip 30. If greater steering effect is desired the operator will continue to twist the hand grip until the desired angular position is obtained.

If the grip is then held in the attained position the steering angle will be maintained; but if the grip is released the switch 40 is broken and the solenoid 22 moves the four-way valve 19 to the castering position in which the springs 18 automatically center the landing gear.

The potentiometers remain energized so that the automatic centering of the landing gear upon release of the hand grip causes the polarized relay 59 to return the follow-up arm 44 to its central or neutral position. The hand grip 30 is also returned to its neutral position, as fast permitted by the follow-up arm slot 43, both by the torsion springs 37 and the centering springs 47.

While the same centering effect will result from opening of the scissors switch 41, it is unlikely that a pilot would take-off with the nose wheel much out of line unless the other landing wheels were of the castering type.

It will be noted that the pilot is unable to turn the landing gear with the switch 41 open but can pre-set the steering control, within the range of the follow-up slot, to become effective upon closing of the switch 41 by ground contact. However, such pre-setting is merely effective in moving the valve 27 which will not be connected to the landing gear steering cylinder 15 until both switches 40 and 41 are closed.

Having thus described my invention and the present preferred embodiments thereof, I desire to emphasize the fact that many modifications may be resorted to in a manner limited only by a just interpretation of the following claims.

I claim:

1. A steerable landing gear including a source of power and control means adapted to apply said power for steering said landing gear, comprising a pair of potentiometers one of which is movable in step with said control means and the other is adapted to be manually adjusted to steer the landing gear, a polarized relay balanced between said potentiometers and arranged to energize said power applying means, a second pair of potentiometers, one of which is responsive to movements of the landing gear, a follow-up mechanism associated with the manually adjustable potentiometer of the first pair of potentiometers, the other of said second pair of potentiometers being responsive to said follow-up mechanism, and a polarized relay balanced between said second pair of potentiometers and arranged to energize said follow-up mechanism.

2. In a steerable and castering landing gear including power means for steering the same and means adapted to shift from castering to steering at will, the combination of a manual control means adapted to initiate the direction and speed of motion of the power means for steering the gear, follow-up means cooperating with said manual control means and so constructed and arranged as to feed back indications of the speed and direction of motion of the power means for steering the gear, and means responsive to lack of ground contact of said landing gear arranged to restore said shifting means to the castering position, the power steering means including means for returning the follow-up means to the central position upon centering of the landing gear in its castering position.

3. In a steerable landing gear including power means for pivoting the same, the combination of manual control means to be moved to accomplish steering, position indicating means carried by the manual control means, a follow-up indicating means adjacent to said first mentioned indicating means, mechanism responsive to out of phase relationships between the two indicating means arranged to control the application of the power means to produce pivotal movement of the landing gear in a direction to restore the phase relationship between the two indicating means, means arranged to drive said follow-up indicating means in phase with the movement of the landing gear, and means arranged to urge said manual control means to its centered position upon release thereof whereby to restore the landing gear to its centered position.

4. The arrangement defined in claim 3 in combination with means arranged to prevent operation of the steering control when the landing gear is out of contact with the ground.

5. A steerable landing gear for airplanes having a shock strut and a control stick comprising a combined hydraulic castering and power steering mechanism, means for supplying hydraulic power to said mechanism when used for steering, means for switching from castering to power steering, a motor operated hydraulic valve for operating said steering mechanism, a manually operable control member carried by the airplane control stick, a potentiometer operated thereby, a follow-up potentiometer connected in phase with said hydraulic valve, a polarized relay balanced between said potentiometers, said relay being arranged to energize said hydraulic valve, a follow-up arm in juxtaposition to said control member, a third potentiometer responsive to movements of the steering mechanism, a fourth potentiometer movable in phase with said follow-up arm, and a second relay balanced between said third and fourth potentiometers and arranged to drive the follow-up arm when said arm is out of phase with said manually operable control member.

KENNETH F. PITTMAN.

REFERENCES CITED

The following references are of record in the file of this patent:

UNITED STATES PATENTS

| Number | Name | Date |
| --- | --- | --- |
| 2,344,352 | Graham | Mar. 14, 1944 |
| 2,474,630 | Jamison | June 28, 1949 |